Aug. 27, 1968 W. C. PEASE III 3,398,457
PROCESS AND APPARATUS FOR MOISTURE CONDITIONING BATCHES
OF SEED COTTON AND THE LIKE
Filed July 8, 1966 3 Sheets-Sheet 1

INVENTOR.
William C. Pease III
BY
Jennings Carter & Thompson
Attorneys

INVENTOR.
William C. Pease III
BY
Jennings, Carter & Thompson
Attorneys

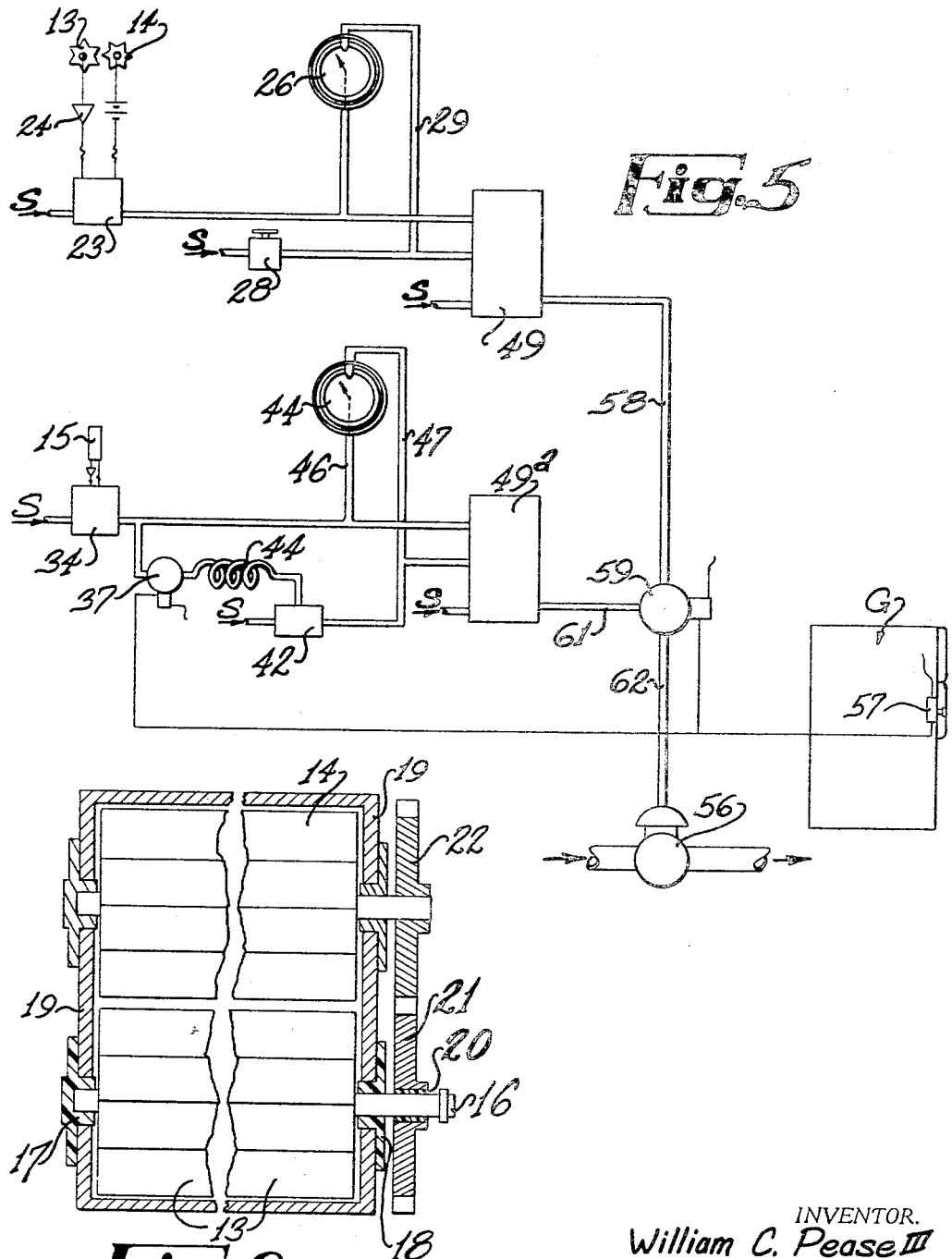

United States Patent Office 3,398,457
Patented Aug. 27, 1968

3,398,457
PROCESS AND APPARATUS FOR MOISTURE CONDITIONING BATCHES OF SEED COTTON AND THE LIKE
William C. Pease III, Columbus, Ga., assignor to Lummus Cotton Gin Company, a corporation of Georgia
Filed July 8, 1966, Ser. No. 563,898
9 Claims. (Cl. 34—10)

ABSTRACT OF THE DISCLOSURE

A process and apparatus for controlling drying and moisture conditioning apparatus for seed cotton and the like, which utilizes a pneumatic controller circuit. The moisture condition of the cotton or similar material is tested continuously by electrical transducers at one or more points as it is passed to and through the drying apparatus. The signal resulting is utilized by the control circuit to vary the temperature of the air within the drying apparatus and thus control the drying condition in the apparatus. When the gin "gins down" at the end of a batch, the input to the control circuit is switched from the moisture sensing transducers to a temperature sensing transducer, and the circuit is altered so as to maintain the temperature at a constant level corresponding to that which obtained in the drying apparatus at the end of the preceding batch.

---

This invention relates to a process and apparatus for moisture conditioning batches of seed cotton and the like and is particularly disposed to be useful in connection with the process and apparatus described in copending application Ser. No. 313,096, filed Oct. 1, 1963 in the names of Donald W. Van Doorn, William C. Pease III, and Jack H. Tinkler now Patent No. 3,280,474, "Process and Apparatus for Moisture Conditioning Seed Cotton and Like Materials."

In the above-identified application there is shown, described and claimed a process and apparatus effective to moisture condition seed cotton and like materials by utilizing "foresight" and "hindsight" signals representative of the moisture content of the material before and after the material enters and leaves the drying apparatus, respectively. In the moisture conditioning of seed cotton the cotton is delivered intermittently to the gin plant in wagon loads which are weighed up to produce substantially even weights of lint, usually 500 pounds to the bale. Thus, such wagon loads constitute batches of cotton and the moisture content of each batch may vary from wagon load to wagon load. Furthermore, in the normal operation of a gin plant, the wagon loads are ginned as individual units, namely bales, and there is an interval of time between the feeding of successive wagon loads. Therefore, it can be said that the cotton is fed intermittently through the system inasmuch as it is desired to maintain the integrity of each wagon load as a final bale.

The rationale of my invention to to provide a moisture conditioning process and apparatus in which, in the drying apparatus, there is maintained for an oncoming batch or wagon load an initial drying condition corresponding to that which existed therein while the immediately preceding batch was being conditioned or treated. In other words, I propose a system in which a subsequent batch of material is initially subjected substantially to the same moisture conditioning to which the last batch of material was subjeced. The principal object of such "memory" feature is to prevent subjecting the next oncoming batch, initially, to a moisture conditioning environment in the system widely different from that just used to treat a batch or wagon load, thereby giving the automatic features of the system time, as a new batch progresses, to bring the conditioning environment to that required for the new batch by actual sensings of its needs for treatment.

In view of the foregoing my invention contemplates a process and apparatus for moisture conditioning seed cotton and like materials in which the material is passed through apparatus including a drier, and the system is held at substantially the conditioning level existing therein while processing a first batch of material, whereby when the next batch starts through it is initially subjected to said level of conditioning factors, thus to increase the accuracy of moisture conditioning each batch.

Another object is to accomplish the foregoing by maintaining in the apparatus the last drying temperature to which a batch of material has just been subjected, whereby a succeeding batch is initially subjected to this same drying temperature until, by sensing the actual moisture conditioning needs of the succeeding batch, the temperature is adjusted to that required by said succeeding batch.

Another object is to provide apparatus in which the material in the system is sensed for its moisture content while in the drying apparatus, and either before or after leaving the drying apparatus, together with means to utilize a combination of these signals to increase or decrease the drying of the material, together with further means to hold the system in the condition determined at the time the last portion of a first batch is being treated, whereby the next batch is initially subjected to the same drying temperature as was the last part of the first batch.

Apparatus illustrating the constructional features of my invention and which may also be used to carry out my improved process is illustrated in the accompanying drawings forming a part of this application in which:

FIG. 5 is a diagrammatic view of a slightly modified form of control system; and FIG. 6 is an enlarged, detail fragmental view taken generally along line 6—6 of FIG. 1.

Figure 1:
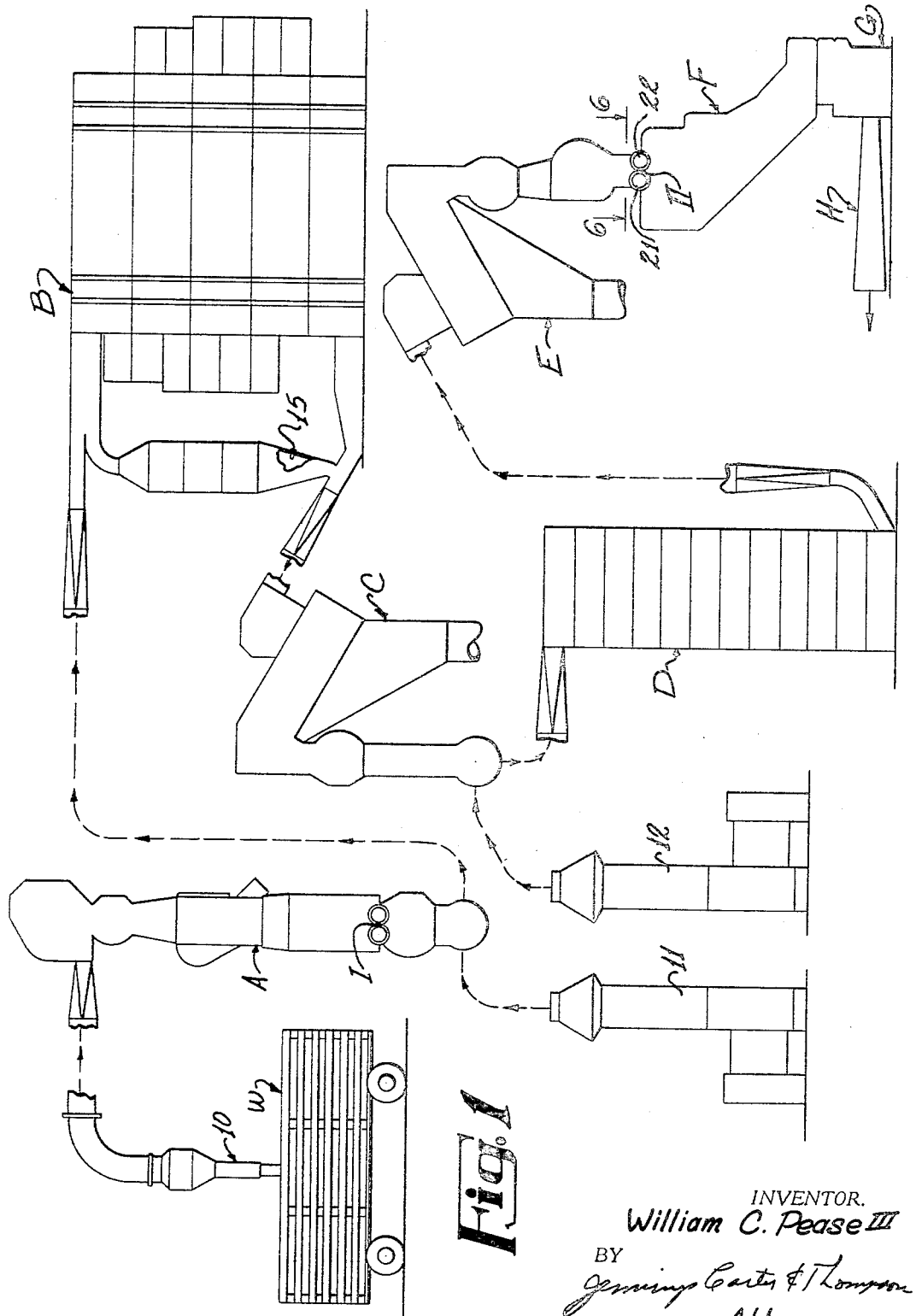
FIG. 1 is a wholly diagrammatic view of a typical gin house plant including the cotton cleaning and drying machinery and a diagrammatic showing of a gin stand.

Referring now to the drawings, and particularly to FIG. 1, I show my invention in association with the type of seed cotton handling and processing machinery which may be found in the modern gin plant. Thus, at A I illustrate a separator together with an automatic suction control device and storage hopper. Cotton from the wagon W is delivered to the apparatus A through the usual suction pipe 10. The cotton next passes as indicated by the arrows to a dryer which may be a high volume cotton dryer, indicated generally by the letter B. From the dryer B the cotton passes to a cleaner C thence to a second dryer D which may be of the tower type, thence to another cleaner and separator E through an automatic feeder F and thence to a gin stand G. As will be understood, the lint is removed from the seed by the gin G and the lint is delivered by each gin stand through a flue H where the lint cotton may be sent through various types of after cleaners, then to a condenser, not shown, for baling.

The parts so far described are standard in the art and may be varied greatly. For instance, if desired, the second dryer D may be eliminated in its entirety whereupon the cotton will go from the unit C directly to the cleaner and separator E. It will further be understood that cotton is pneumatically conveyed from one machine to the other. Hot air is introduced into the system by means of the liquid or gaseous fueled burner units indicated at 11 and 12. In accordance with the process and apparatus of the above identified copending application, the amount of heat output of the burners 16 and 17 at the proper time and in the proper amount is determined by the means and process set forth in said copending application. As before stated, the object of my present invention is to maintain the drying system of the apparatus herein described at the same temperature that existed therein upon the passage of a first batch of cotton, so that an oncoming batch of cotton is subjected initially to this same drying environment or condition.

As illustrated in the drawings I propose to sense the moisture in the cotton either before the cotton enters the drying system hopper or after it leaves the drying system. Additionally, I propose to sense the temperature of the air which has been used to dry the cotton as for instance by inserting a temperature responsive probe 15 into some part of the dryer D, preferably near the discharge thereof so as to be contacted by the hot air which actually is doing the drying of the cotton. As will be appreciated, the temperature reflected by the probe 15 bears a relation to the amount of moisture which has been evaporated from the cotton by the hot air. However, as is pointed out in the above copending application, merely using the temperature reading of such air is not wholly effective to control the drying system. Such accurate control may be obtained by using a combination of moisture sensings as therein disclosed. Therefore, in this present disclosure I will not go into detail with respect to the function of the multiple moisture sensing units, but will illustrate my invention with a moisture sensing unit which may be located either before the cotton enters the dryer or after the cotton leaves the dryer.

Referring again to FIG. 1, for the purposes of the present invention I prefer to locate a moisture senser at point II in the system, namely, just ahead of the gin stand. However, I may, under some circumstances, locate the moisture sensing means at point numbered I in FIG. 1, namely at the bottom of the storage hopper A, that is, a point in the system before the cotton enters the dryer proper. By way of example, this may be done by isolating one of the feed rolls 13 of the overhead feeder F from the other feed roll 14 thereof. As shown particularly in FIG. 6, the shaft 16 of the feed roll 13 is mounted in bearings 17 and 18 of insulating material such as "nylon" at the place where the shaft passes through the housing walls 19 of the feeder. Further, the roll 13 is driven by means of a gear 21 which may conveniently be in mesh with a similar gear 22 on the end of the feed roll 14. In order to complete the isolation of the roll 13 a bushing 10 of insulating material such as "nylon" is interposed between the hub of the gear 21 and the shaft 16. The gear may be made fast to the shaft 16 through the bushing by any suitable means whereby when power is applied to the shaft or roll 14, through a belt or the like, not shown, the feed rolls 13 and 14 are driven in opposite directions, thus to drop the seed cotton down into the overhead feeder F.

Another practical sensor may be provided by mounting a plate within the apparatus in position to be contacted by the cotton moving through the system. This plate must be electrically insulated from the walls of the apparatus whereby the plate forms one electrode and the walls of the apparatus form the other electrode of the sensor.

It will be appreciated that either of these forms of sensors may be applied at point I, or at point II, or both.

Further, it will be understood that the type of signal obtained from the sensors at point I or point II is in the form of an electric signal as disclosed in the above identified copending application and it is through the use of such signal that the control system is operated penumatically, electrically or otherwise.

Figure 2:
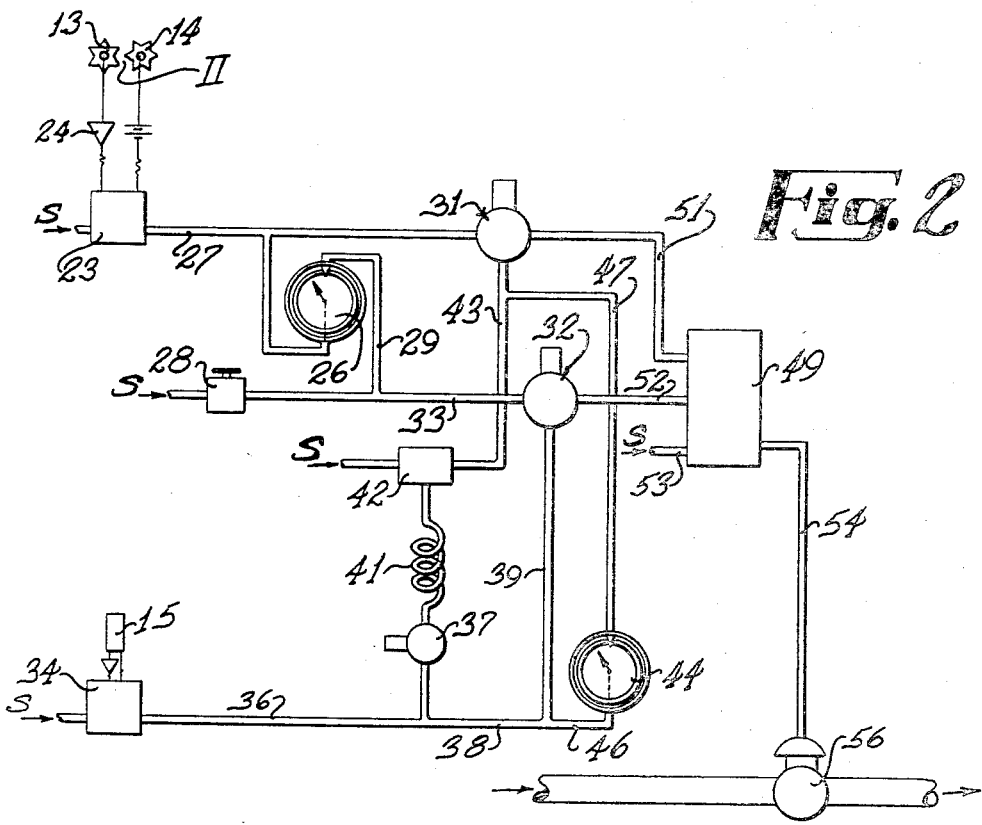
FIG. 2 is a diagrammatic view of my improved "memory" control system.

Referring now particularly to FIG. 2 of the drawing it will be seen that the circuits from the rollers 13 and 14 lead to a transducer 23 which may conveniently be a model M77–3 transducer manufactured by Moore Products Company, Philadelphia, Pa. The transducer 23 is of the type to change the output signals from an amplifier 24 in circuit with the electrodes of the sensor to an air signal proportionate in pressure to the current received. The range of the transducer in pneumatic pressure may be from 3 to 15 pounds output. Also, this type of transducer may operate on a 20 pound air pressure input as indicated at S, FIG. 2. At 26 I show a duo-gauge, one reading of which indicates the output pressure in line 27 from the transducer 23 and the other of which indicates a control point pressure from a manually operable set point regulator numbered 28. It will be understood that the set point regulator also is supplied with the source pressure S and that it is connected to the gauge 26 by a line 29.

Connected in the line 27 is a three-way solenoid operated valve 31. A second three-way solenoid actuated valve 32 has one of its inlet connections connected to a line 33 leading from a line 29 and from the set point regulator 28.

The output of the temperature transducer indicated at 34 is connected by a line 36 to the input side of a two-way solenoid controlled valve 37. The input side of the two-way valve 37 also is connected by a line 38 and a branch line 39 to one of the other input ports of the valve 32. At the discharge side valve 37 is connected through a volume chamber 41 to a 1 to 1 booster relay 42 also supplied with the source pressure S. The output of the booster relay 42, which incidentally, may be a model 61 F, Moore Products Company unit is connected by a line 43 to the other inlet of the solenoid valve 31. At 44 I show a temperature duo-gauge connected by a branch line 46 to line 38 and by another branch line 47 to the line 43. As will later appear, while a batch of cotton is passing through the apparatus the temperature duo-gauge 44 reads the output of the temperature transducer 34 on one side and also reads the output of the booster 42 on the other side. During this phase of operation, these two values are, for all practical purposes, identical.

At 49 I show a Moore Products Company "Nullmatic" controller which may be a model 50 W of that company. The controller relay has a process inlet which is connected by a line 51 to the discharge port of valve 31. A control point inlet for the controller is connected by a line 52 to the discharge port of valve 32. The source pressure is supplied to the controller through a line 53 from the source S as illustrated. The outlet of the controller is connected by a line 54 to the pneumatic controls 56 for the burners 11 and 12.

Figure 3:
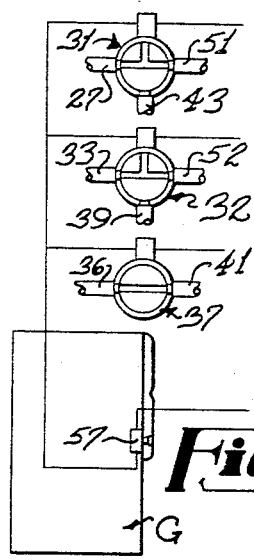
FIG. 3 is a diagrammatic view illustrating the position of the several control valves while the system is in operation.
Figure 4:
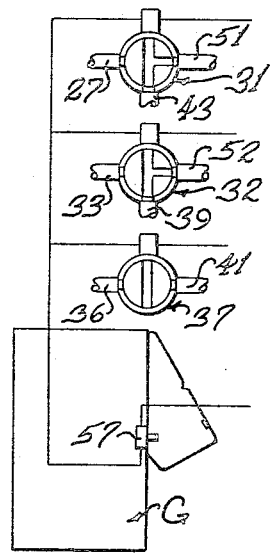
FIG. 4 is a view corresponding to FIG. 3 and showing the position of the control valves when the gin stand is in the out or nonginning position, namely, the position occupied by the gin stand and valves at the end of ginning a batch of cotton or wagon load of cotton.

Referring particularly to FIGS. 3 and 4 it will be seen that each of the solenoids of the valves 31, 32 and 37 is controlled by a switch 57 associated with the gin stand. Thus, and as shown in FIG. 3, when the breast of the gin stand is in closed, operating position, switch 57 is closed, whereby all of the valves just named are held in the positions indicated in FIG. 3. However, and as will later appear, when the gin breast is opened, either automatically or manually, switch 57 is opened, whereby the respective valves 31, 32 and 37 move to the positions indicated in FIG. 4.

From the foregoing the method of carrying out my improved process as well as the operation and construction of my improved apparatus may now be more fully explained. Assuming that the wagon W is being unloaded and that an airborne stream of cotton is moving through the system, and further assuming that the moisture content of the cotton is being sensed from point II the operation of my invention is as follows: The control valves 31, 32 and 37 are in the position of FIG. 3, wherein a signal is received from the rollers 13 and 14 which indicates the moisture content of the cotton in terms of its electrical properties. This signal, being fed to the transducer 23, is converted to a pneumatic signal which is impressed through the line 51 onto controller 49. During this time the temperature senser 15 reads the then present temperature at the discharge end of the dryer, this reading is shown by both elements of the duo-gauge 44. Let it be assumed now that all of the given batch or bale of cotton passes through the gin stand G. Immediately that the gin "gins down" the breast is either manually or automatically thrown to the position of FIG. 4, opening switch 57. This causes the valves 31, 32 and 37 to assume the positions of FIG. 4 whereupon the closing of valve 37 traps in the chamber 41 the pressure which existed therein while the cotton just mentioned was passing through the apparatus. Due to the change over of valve 31, pressure from the booster 42 corresponding to the pressure trapped in chamber 41 is impressed through lines 43 and 51 to the process inlet of the controller 49. The booster makes up any leakage which might be present in the lines or valves and thus provides a constant pressure signal to the controller 49. Due to the shifting of valve 32 to the position of FIG. 4 pressure from the transducer 34 is supplied through lines 39 and 52 to the control point connection of the controller. Thus, the variable is now put into the control port of the controller instead of into the process port thereof.

The foregoing reversal of control point and process connections to the controller is necessary because during the dynamic phase of operation, that is, when cotton is in the apparatus, an increase in moisture content of the cotton, as determined by the transducer 23, calls for an increase in heat, namely, opening wider the valve to the burners 11 and 12, whereas, a decrease in moisture content calls for less temperature and thence closing of the fuel valve to the burners 11 and 12. On the other hand, during the static phase of operation, that is, after a batch of cotton has passed through the apparatus, the temperature is to be maintained at a constant level, and therefore an increase in temperature calls for a decrease in heat, namely, closing the valves to the burners 11 and 12. In other words, when the variable is a moisture content of the cotton it is applied to the process connection of the controller; however, when the variable is temperature as is the case when there is no cotton in the system, it is applied to the control point connection of controller 49. Stated another way, while an increase in the temperature calls for lower setting of valve 56, an increase in moisture calls for an higher or more open setting of valve 56.

In FIG. 5 of the drawings I show a somewhat modified form of my invention although the principle of operation is substantially the same as that already described. In FIG. 5 corresponding parts are numbered correspondingly to those of the other figures. In FIG. 5 I show an additional controller 49a which is controlled by the temperature transducer 34. A line 58 leads from the output side of the controller 49 to one inlet side of the valve 59 which is solenoid actuated. The separate controller 49a, identical to 49, has its output side connected by a line 61 through the other inlet side of the three-way solenoid valve 59. A line 62 connects the outlet side of the three-way valve 59 to the fuel control valve for the burners 11 and 12.

In normal operation, that is, with cotton passing through the system, the temperature sensing probe 15 is inoperative in the system just described and the moisture content of the cotton is being controlled by the signals obtained from the rollers 13 and 14 through the means shown. When the gin breast moves to out position switch 57 opens, changing the valve 59 to connect the line 61 to line 62. This cuts out of the system any effect of any signal thereafter obtained through controller 49. It will also be noted that when the gin breast opens valve 37 rotates to lock into the chamber 44 a pressure corresponding to the last reading from the probe 15. The booster then holds the pressure constant, make-up air being supplied for any leakage which may be present. In connection with FIG. 5 it will be noted that the controller 49 is set so that an increase in moisture as determined by the signal from the roller 13 and 14 calls for an increase in heat to the burners. Similarly, controller 49a is set so that an increase in temperature as reflected from the probe 15 causes a decrease in the setting of the valve controlling the heaters when the system is empty of cotton or between batches.

In connection with the set point regulator 28, it will be understood that it is manually set to give a pneumatic signal to the controller for the desired moisture content. This is read on the duo-gauge by a pointer thereof which is actuated by such pressure.

In view of the foregoing it will be apparent that I have devised an improved means for maintaining a materials moisture conditioning apparatus at a temperature corresponding to that at which a previously conditioned batch of material was treated. When my improved "memory" process and apparatus is employed in conjunction with the automated system disclosed in application Ser. No. 313,096, now Patent No. 3,280,474, a complete overall automated system is provided. Also, while I have shown pneumatic controls it will be apparent that the controls may be actuated by hydraulic pressure, electrical energy, or otherwise.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim:

1. The process of moisture conditioning materials such as seed cotton wherein batches of the material are passed intermittently through a material handling system which includes drying apparatus comprising the steps of:
    (a) passing a batch of the material in an airborne stream through the system,
    (b) continuously obtaining a signal corresponding to the moisture content of said batch,
    (c) controlling the temperature of the air in the drying apparatus in response to said signal thereby maintaining in the drying apparatus a drying condition to bring the moisture content of the batch to a predetermined level,
    (d) controlling the temperature of the air in the drying apparatus after said batch has passed through the system to maintain substantially the same drying condition as last existed in the system when said batch was passing therethrough, and
    (e) passing a subsequent batch of the material through the system whereby a forwardmost portion of said subsequent batch of material initially is subjected to substantially the same drying condition as that to which the first mentioned batch of material was last subjected.

2. The process of moisture conditioning materials such as seed cotton as defined in claim 1 wherein element (b) of claim 1 includes the steps of obtaining a signal corresponding to the moisture content of the material prior to passing through the drying apparatus and a signal corresponding to the moisture content of the material after passing through the drying apparatus and combining the two signals to obtain a controlling signal.

3. Apparatus for controlled drying of materials such as seed cotton wherein quantities of the material are passed intermittently through drying apparatus comprising:

(a) means to maintain in the apparatus a predetermined drying condition during times when material is flowing through the apparatus, and (b) means responsive to interruptions of flow of material through the apparatus to maintain in the apparatus while material is not flowing therethrough said predetermined drying condition, whereby upon resumption of flow of material through the apparatus it initially is subjected to substantially said predetermined drying conditions.

4. Apparatus for controlled drying of materials such as seed cotton wherein quantities of the material are passed intermittently therethrough comprising:

(a) means to maintain in the approach a predetermined drying condition which produces a resultant temperature in the apparatus during periods when material is flowing through the apparatus, and (b) means responsive to interruptions in flow of material through the apparatus to maintain in the drying apparatus a temperature substantially corresponding to that prevailing under said predetermined drying conditions when said material was flowing therethrough, whereby upon resumption of flow of materials the incoming material initially is subjected to substantially said predetermined drying condition.

5. Apparatus for controlled drying of materials such as seed cotton wherein quantities of the material are passed intermittently through drying apparatus comprising:

(a) means including a source of heated air to maintain in the apparatus a predetermined drying condition while the first quantity of material is moving through the apparatus, and (b) means to maintain the drying apparatus at a temperature corresponding to that prevailing under said predetermined drying condition during periods when no material is flowing therethrough, whereby upon passage of a second quantity of material through the apparatus it initially is subjected to substantially the same drying condition as was said first quantity of material.

6. Apparatus for controlled drying of materials such as seed cotton wherein batches of material are passed intermittently through drying apparatus comprising:

(a) means to obtain a first signal corresponding to the moisture content of the batch of material passing through the apparatus, (b) means responsive to said first signal to control the drying condition in said drying apparatus while said batch is passing therethrough to bring the moisture content of the material to a predetermined level, (c) means to provide a second signal corresponding to the temperature produced in the drying apparatus, and (d) means responsive to said second signal to maintain in the drying apparatus after said batch has passed therethrough substantially the same temperature as was last present in the apparatus while said batch was passing therethrough.

7. Apparatus as defined in claim 6 in which said means responsive to said first signal comprises:

(a) a heater supplying heated air to the drying apparatus, (b) valve means controlling the flow of fuel to the heater, (c) means to regulate said valve means in response to said first signal whereby more fuel is delivered to the heater when said first signal indicates an increase in moisture content of the material, and less fuel is delivered to the heater when said first signal indicates a decrease in moisture content of the material.

8. Apparatus as defined in claim 7 in which said means responsive to said second signal comprises:

(a) means to lock said first signal out of the system in response to cessation of flow of material through the apparatus, and (b) means to regulate said valve means in response to said second signal to decrease the flow of fuel to the heater when said second signal indicates an increase in temperature in the apparatus, and to increase the flow to said heater when second signal indicates a decrease in temperature in the temperature in the apparatus whereby a substantially constant temperature corresponding to the last temperature condition in the apparatus when said material was flowing therethrough is maintained when said material is not flowing therethrough.

9. Apparatus as defined in claim 8 which includes:

(a) means to provide a reference signal corresponding to a desired moisture level, (b) means to provide a reference signal corresponding to and determined by the temperature last present in the drying apparatus while said batch was passing therethrough, (c) said means to regulate said valve means in response to said first signal and said means to regulate said valve means in response to said second signal comprise a controller having process and control point inputs, (d) switch means effective to connect said means to obtain a first signal to the process input of the controller and said means to provide reference signal corresponding to a desired moisture condition to the control point input of the controller while said batch of material is passing through said drying apparatus and effective to connect said means to provide a second signal to the control point input of the controller and said means to provide a reference signal corresponding to and determined by the temperature last present in the drying apparatus to the process input of the controller after said batch of material has passed through said drying apparatus whereby while said batch of material is passing through the drying apparatus more fuel is delivered to the heater when said first signal indicates an increase in moisture content of the material and less fuel is delivered to the heater when said first signal indicates a decrease in moisture content of the material and after said batch of material has passed through the drying apparatus less fuel is delivered to the heater when said second signal indicates a temperature in excess of the temperature last present in the drying apparatus while said material was flowing therethrough and more fuel is delivered to the heater when said second signal indicates a temperature less than said last present temperature.

References Cited

UNITED STATES PATENTS 3,114,613  12/1963  Neitzel et al. _____ 34—48

JOHN J. CAMBY, *Acting Primary Examiner.*